(12) United States Patent
Wietfeldt

(10) Patent No.: US 6,915,142 B1
(45) Date of Patent: Jul. 5, 2005

(54) SYSTEMS AND METHODS FOR MULTI-MODE WIRELESS COMMUNICATION

(75) Inventor: Richard D. Wietfeldt, San Diego, CA (US)

(73) Assignee: Novatel Wireless, Inc., San Diego, CA (US)

( * ) Notice: Subject to any disclaimer, the term of this patent is extended or adjusted under 35 U.S.C. 154(b) by 765 days.

(21) Appl. No.: 09/961,459

(22) Filed: Sep. 21, 2001

(51) Int. Cl.$^7$ ................................................ H04B 1/38
(52) U.S. Cl. ..................................... 455/557; 455/41.3
(58) Field of Search ............................. 455/557, 556.1, 455/556.2, 558, 344; 370/338

(56) References Cited

U.S. PATENT DOCUMENTS

2001/0053701 A1 * 12/2001 Hattori ....................... 455/550
2001/0055283 A1 * 12/2001 Beach ......................... 370/328

* cited by examiner

*Primary Examiner*—Nick Corsaro
(74) *Attorney, Agent, or Firm*—G. Peter Albert, Jr.; Foley & Lardner, LLP

(57) ABSTRACT

A device includes a wireless modem configured to communicate with a wireless network and an interface unit communicatively coupled to the wireless modem. The interface unit is configured to interface a host device to a portable computing device, interface the host device with the wireless network through the wireless modem, and interface the portable computing device with the wireless network through the wireless modem.

25 Claims, 10 Drawing Sheets

SYSTEMS AND METHODS FOR MULTI-MODE WIRELESS COMMUNICATION

BACKGROUND OF THE INVENTION

1. Field of the Invention

The invention relates generally to wireless communication and more particularly to systems and methods for multi-mode wireless communication that involve a device configured to interface a host computer to a portable computing device and to interface the host computer and/or personal computing device to a wireless Wide Area Network (WAN).

2. Background

The use of portable computing devices is expanding. To increase the usefulness and convenience of these devices, they typically can communicate with host computers in order to download and synchronize information. Additionally, portable computing devices are increasingly being used to connect to wireless WANs. The host computers used in conjunction with the portable computing devices can also include a wireless WAN or Local Area Network (LAN) connection.

To access a wireless WAN, the host computer or portable computing device includes a wireless modem that is configured to implement whatever wireless access technology is required by the wireless WAN. Unfortunately, the explosion of generally incompatible wireless access technologies can often result in host computers and portable computing devices incorporating wireless modems that are incompatible with each other. Thus, a user may end up with a host computer and a portable computing device that can interface with each other, but that use incompatible methods to connect to incompatible wireless networks. Therefore, the user will often need to purchase a different type of wireless modem for each device. Even if the two devices initially use the same type of wireless modem, problems can still occur if the user would like to use or subscribe to a different and/or better wireless network. In this case, the user may be able to upgrade one device to a particular network, but no the other.

Wireless network incompatibility is also a problem for manufacturers and system integrators trying to decide what type of wireless access technology to incorporate into their devices. One solution to the compatibility problem is to use the same wireless modem for both the portable computing device and the host computer. The user then only has to buy one wireless modem for use with both devices. And if the user wants to change the wireless service, then the user only needs to replace one wireless modem. This solution has drawbacks, however. Primarily, the user can only connect one device to the wireless network at a time. Further, the user will constantly be removing or disconnecting the wireless modem from one device in order to install it in, or connect to, the other. Therefore, this solution is not optimal.

SUMMARY OF THE INVENTION

According to one aspect of the invention, a device comprises a wireless modem configured to communicate with a wireless network and an interface unit communicatively coupled to the wireless modem. The interface unit is configured to interface a host device to a portable computing device, interface the host device with the wireless network through the wireless modem, and interface the portable computing device with the wireless network through the wireless modem.

According to one embodiment, the device is configured to interface the portable computing device and/or the host device through the wireless modem to a server connected to the wireless network for data communication.

According to another embodiment, the device is configured to interface the portable computing device through the wireless modem to a server connected to the wireless network for synchronizing information.

According to still another embodiment, the device is configured to interface the host device to the portable computing device through the interface unit for synchronizing information.

In accordance with a second aspect of the invention, a system comprises a server connected to a wireless network, a portable computing device, a host device, and a device such as the device described in relation to the first aspect. Therefore, the device comprises a wireless modem configured to communicate with the wireless network and an interface unit communicatively coupled to the wireless modem.

Other aspects, advantages and novel features of the invention will become apparent from the following Detailed Description of Preferred Embodiments, when considered in conjunction with the accompanying drawings.

BRIEF DESCRIPTION OF THE DRAWINGS

Preferred embodiments of the present inventions taught herein are illustrated by way of example, and not by way of limitation, in the figures of the accompanying drawings, in which.

DETAILED DESCRIPTION OF THE PREFERRED EMBODIMENTS

Figure 1:
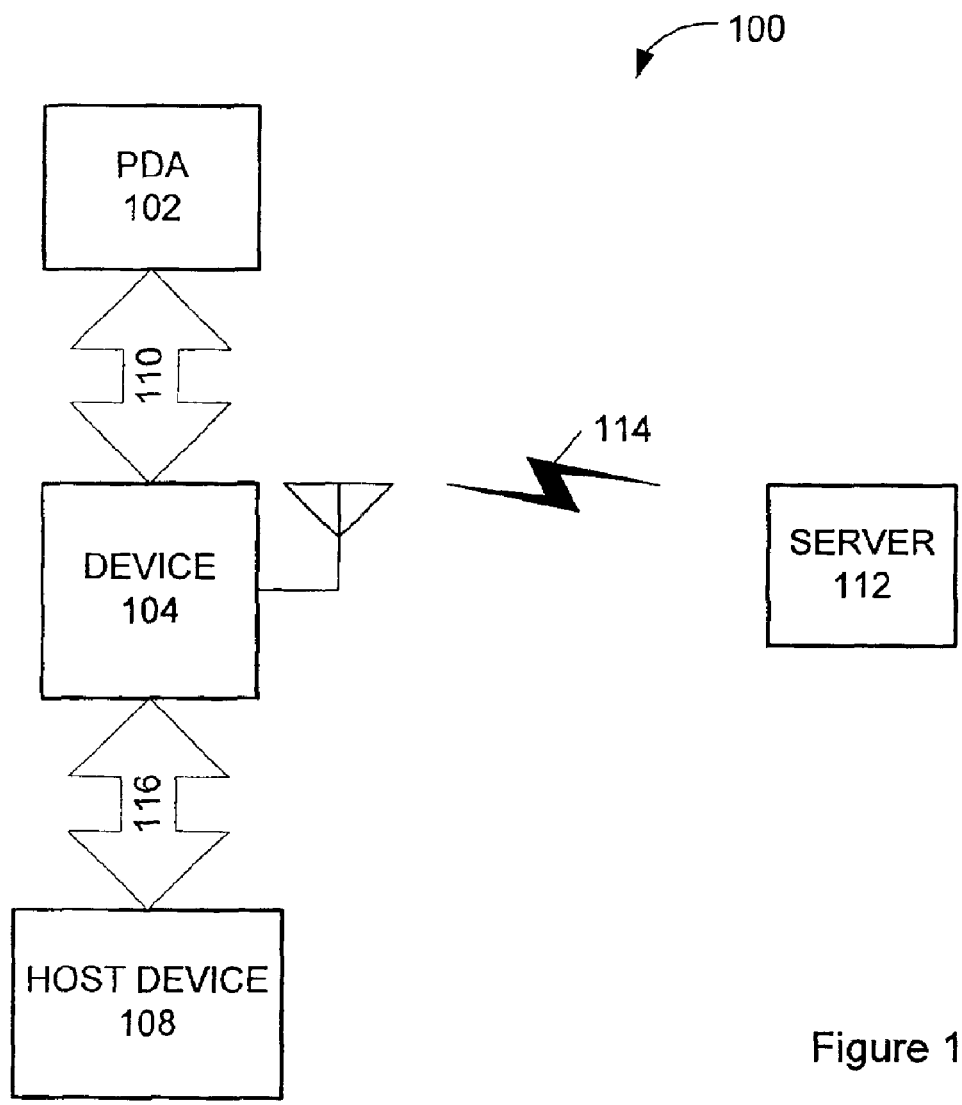
FIG. 1 illustrates one example embodiment of a multi-mode wireless communication system in accordance with the invention.

To combat the problems with wireless network access described above, the systems and methods for multi-mode wireless communication use a multi-mode communication device that incorporates a wireless modem and an interface unit for interfacing either the portable computing device or the host computer to the wireless modem, or to connect the devices to each other. Therefore, both the portable computing device and the host computer can be connected to the wireless modem at the same time and the user does not need to constantly switch connections depending on which device the user would like to connect to the wireless network. Such a multi-mode communication device can have many embodiments, some of which are described below.

1. The Portable Computing Device

First, the term portable computing device encompasses many different types of devices, such as a laptop computer for example. There are also many smaller portable computing devices, e.g., palm computers or handheld computers. One popular type of handheld computer is the Personal Digital Assistant (PDA). These types of devices are typically used to store contact information, schedules, and notes, and include a variety of other applications and programs. Additionally, these devices can be equipped with a wireless modem in order to receive emails or text messages. These devices are even being configured to incorporate wireless voice communication as well. Thus, the discussion that follows generally refers to PDAs; however, it will be apparent that the systems and methods described herein will work equally well with other types of portable computing devices.

Portable computing device can typically be connected with a host computer. A host computer can be a desk top or laptop computer. Because host devices include many of the applications included in portable computing devices, such as contact organizers and schedulers, it is convenient for a user to be able to interface the user's portable computing device with the user's host computer so that the devices can share such information. The process of sharing information between devices in this manner is referred to as synchronizing or syncing the devices, and the syncing capability is referred to as a sync or hotsync capability.

Thus, the systems and methods for multi-mode wireless communication use a multi-mode communication device to interface a portable computing device with a host computer. But the multi-mode communication device also includes a wireless modem for connecting the portable computing device and the host computer to a wireless network, such as a wireless WAN.

2. The Multi-Mode Communication Device

The physical form of the multi-mode communication device depends on the requirements of the devices with which it is interfacing. For example, if the portable communication device is a PDA, the multi-mode communication device can be a sleeve designed to couple closely with the PDA or a cradle designed for the PDA to be set into. The sleeve or cradle then includes a wireless modem and an interface unit designed to interface the PDA and the host device to the wireless modem and to each other.

If the multi-mode communication device is a sleeve, then preferably the PDA can still be designed to be placed, with the attached sleeve, into a type of cradle or docking station. The docking station will preferably interface a battery charging signal to the PDA and can be used to interface accessories, such as a keyboard, to the PDA. If, on the other hand, the multi-mode communication device is a cradle, then preferably the cradle incorporates the docking station functions, or the docking station can be configured to mate with the cradle.

The systems and methods for multi-mode wireless communication will now be described with reference to a PDA cradle/sleeve. Again, however, the systems and methods described herein apply regardless of what type of portable computing device is used and regardless of the physical form of the multi-mode communication device.

FIG. 1 illustrates a first embodiment of a multi-mode communication system 100 in accordance with the systems and methods for multi-mode wireless communication. Within system 100, multi-mode communication device 104 serves as a central access point through which both PDA 102 and host device 108 can access a WAN or other wireless network.

Device 104 includes a wireless modem and is used to connect PDA 102 to a server 112 over a communication channel 114. Communication channel 114 is preferably part of a WAN to which server 112 is connected. There will preferably be several servers that are connected to the WAN, of which server 112 serves as an example.

Device 104 can also be used to connect host device 108 to server 112. As such, there is no need to purchase separate and likely incompatible, wireless modems for the two devices 102 and 108, respectively. Also, if the user or system integrator decides to change wireless access technology, only the modem in device 104 needs to be replaced.

Device 104 also provides a connection between PDA 102 and host device 108 for syncing the two devices. Therefore, device 104 can be used in one of four modes:

1. PDA 102 to host device 108—Device 104 can be used to interface PDA 102 with host device 108 for syncing purposes.
2. PDA 102 to server 112—Alternatively, device 104 can be used to interface PDA 102 to server 112 so that PDA 102 can sync information with server 112.
3. PDA 102 to server 112—Device 104 can also be used to interface PDA 102 to server 112 so that PDA 102 can transfer data to and from server 112.
4. Host device 108 to server 112—Finally, device 104 can interface host device 108 to server 112 so that host device 108 can transfer data to and from server 112.

Device 104 interfaces to PDA 102 using interfaces 110 and to host device 108 using interface 116. Therefore, the signals and signaling protocol comprising these interfaces will depend on the requirements of devices 102 and 108 interfaced with device 104. Some specific examples of the types of signals and signal protocols employed by device 104 will be explored in more detail below.

Figure 2:
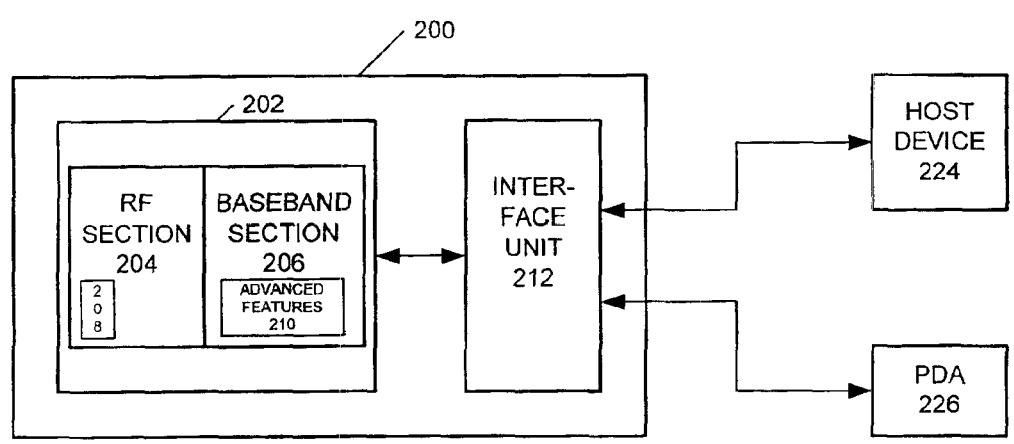
FIG. 2 illustrates one example embodiment of a device that can be used in conjunction with the system illustrated in figure one.

FIG. 2 illustrates, in more detail, a second embodiment of a multi-mode communication device 200 designed in accordance with the systems and methods for multi-mode wireless communication. Device 200 comprises a wireless modem 202 and an interface unit 212. Wireless modem 202 comprises RF section 204 and baseband section 206. RF section 204 is responsible for interfacing PDA 226 and host device 224 with a WAN or other wireless network. Baseband section 206 is responsible for communicating information from PDA 226 and/or host device 214 to and from the WAN. RF section 204 and baseband section 206 are discussed in detail in the following sections.

a. The RF Section

Figure 3:
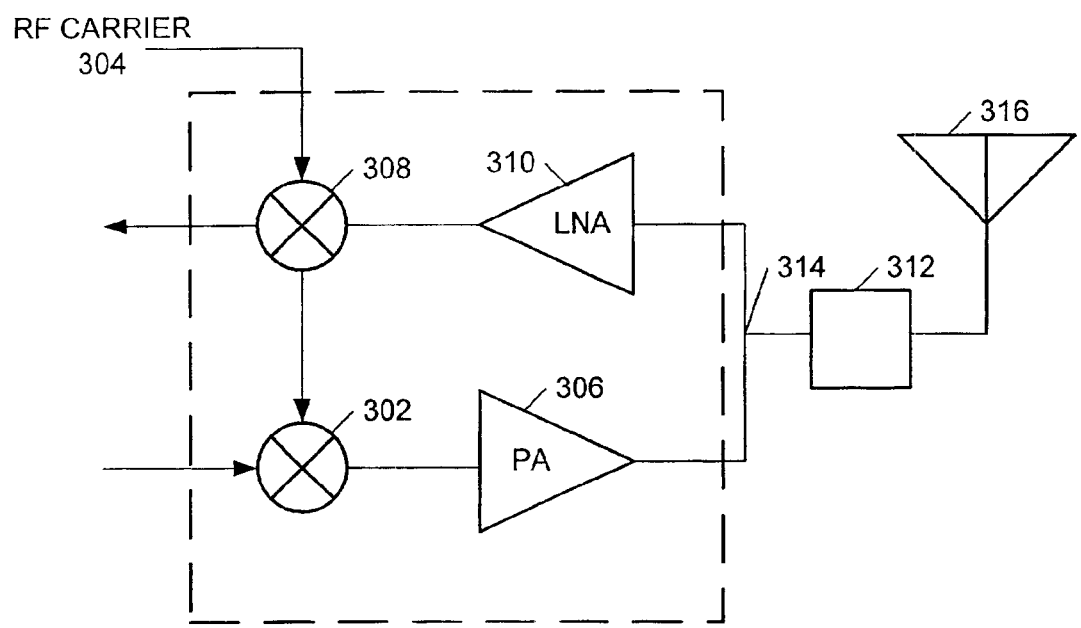
FIG. 3 illustrates an exemplary wireless transceiver that can be used in the device of FIG. 2.

RF section 204 comprises a transceiver used to transmit and receive RF signals over a wireless communication channel. An example transceiver 300 is illustrated in FIG. 3. Transceiver 300 is split into a transmit and receive path. The transmit path comprises a modulator 302 that modulates baseband signals from baseband section 106 with an RF carrier 304 in order to generate an RF transmit signal. RF carrier 304 is a sinusoidal carrier signal with a frequency equal to that required by the communication channel used by device 200 to communicate over the WAN. The transmit path of transceiver 300 may also include a Power Amplifier (PA) 306. PAs are typically key components in any high frequency RF transmitter design. This is because RF transmitters typically require high output power to compensate for path losses and to achieve satisfactory signal levels at the antenna connected to antenna connector 208.

The receive path of transceiver 300 comprises a demodulator 308 that modulates a received RF signal with RF carrier 304 in order to remove the carrier and extract the baseband information signal from the received RF signal. The receive path may also include a Low Noise Amplifier (LNA) 306. The RF signals received by the antenna are typically at very low signal levels. Therefore, a LNA 310 is required in order to amplify the signal level, but not introduce noise that could swamp the low-level received signal.

The receive and transmit paths are typically duplexed over a common connection to antenna 316. The impedance of the connection, however, needs to match the impedance of the antenna for the antenna to transmit the RF transmit signal efficiently. If the impedance is not matched, then RF energy will be reflected back in the opposite direction when a transmit or receive RF signal reaches the connection. Therefore, a matching network 312 can be included in order to match the impedance between the connection and the antenna. Typically, for example, the connection will have impedance of 50 ohms. Therefore, the matching network needs to adjust the impedance of the antenna to be reasonably close to 50 ohms.

RF section 204 includes antenna connection 208 for connecting wireless modem 202 to whatever antenna is being used. Preferably, antenna connection 208 is a standard connector used for all wireless access technologies that device 200 can be configured to implement. This would significantly reduce design complexity by allowing a standard connector to be selected for all possible configurations of device 200, which would further save manufacturing time and cost.

Differences in wireless access technologies, host devices, and PDAs makes it difficult, however, to have a common antenna connection for all possible configurations of device 200. These differences require that different antenna types be used, which prevents the use of a standard connector for several reasons. The first reason is that direct antenna connections are generally custom designed for the specific antenna type and cannot be reused for other antenna types. Second, different antennas will require different tuning, which will not only impact the type of connector, but can also impact the design of RF section 204. Third, regulatory requirements may preclude using a standard connector for all configurations.

Preferably, however, wireless modem 202 comprises an antenna connector 208 that is reusable for as many configurations as possible. Thus, permitting the use of a broad range of antenna solutions including internal, external, and patch antennas. Further, with the advent of third generation (3G) wireless systems, it may be possible to use a common antenna and therefore a common antenna connector 208.

Regardless of what connector is used, it is also preferable for wireless modem 202 to have a standard location for antenna connector 208. This way, design time and cost can be saved.

A second antenna may be required depending on what advanced features are supported by device 200. For example, if device 200 supports Bluetooth™ or GPS, then a second antenna is needed. A secondary antenna connection can be located elsewhere and is not necessarily limited by the location of antenna connector 208. Preferably, however, device 200 also comprises a standard location for any secondary antenna connector that may be required. As with antenna connector 208, a standard location for secondary antenna can save time and cost.

The wireless access technology defines how a communication channel in a particular wireless network is accessed. RF section 204 is responsible for implementing the appropriate wireless access technology.

Wireless networks can be classified according to the method used to provide access to multiple users seeking to utilize the system in parallel, i.e., the wireless access technology. In Frequency Division Multiple Access (FDMA) systems, the available frequency spectrum is divided into multiple narrow bands, each of which defines a separate channel. Different users are allocated different bands. Since the bands are separated by frequency, multiple users can access the system in parallel. The original wireless networks all used FDMA. The name for these systems was Advanced Mobile Phone Service (AMPS).

In Time Division Multiple Access Systems (TDMA), the available frequency spectrum is divided into multiple narrow bands, and each band is in turn divided into multiple time slots. A channel is defined as a particular time slot within one of the frequency bands. Again, since the channels are separated in time, or time and frequency as the case may be, multiple users can access the system in parallel.

In Code Division Multiple Access (CDMA) or Direct Sequence Spread Spectrum (DSSS) systems, channels are defined by complementary, orthogonal or pseudo-random spreading sequences or codes. The spreading sequence has a frequency much higher than that of a user's information signal. Each user is assigned a unique spreading sequence. At the transmitter, the user's information signal is multiplied by the spreading sequence assigned to the user. Since the frequency of the spreading sequence is much higher than that of the user's information signal, the bandwidth of the information signal is effectively spread by this action.

The spread signals for each of the users are then simultaneously or concurrently transmitted over the same wideband frequency spectrum. As the receiver, each user's information signal is retrieved from the received signal by multiplying the received signal by the spreading sequence for the user, and then integrating and sampling the product. Since the spreading sequences are orthogonal or pseudo-random, each user's information signal can be retrieved from the same received signal.

RF section 204 is also configured in accordance with the multiple access technology being implemented. As will be discussed in the next section, the wireless access technology also has a large impact on what type of communication protocol is needed.

b. The Baseband Section

Figure 4:
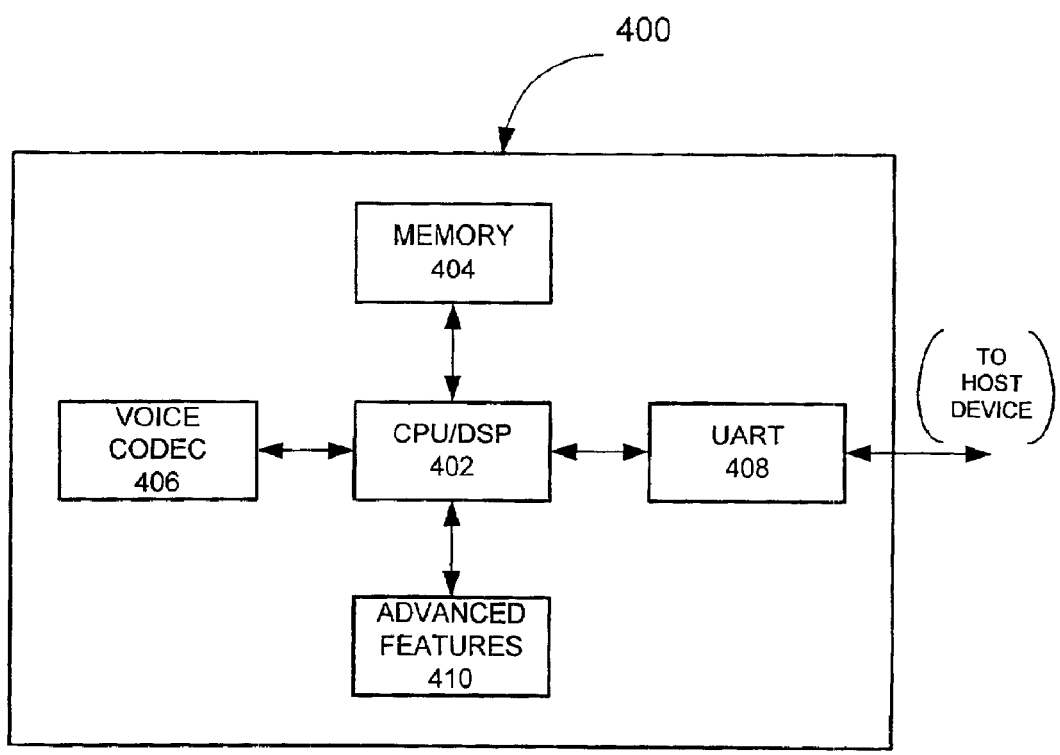
FIG. 4 illustrates one example embodiment of a wireless modem that can be used in the device of FIG. 2.

FIG. 4 illustrates an example embodiment of a baseband section 400. Baseband section 400 comprises a CPU/DSP 402 that controls the operation of baseband section 400. Baseband section 400 also includes a memory 404 for storing application software and data used by CPU/DSP 402 to operate baseband section 400. Baseband section 400 can also includes a voice codec 406. Voice codec 406 is used to encode and decode voice information. Therefore, if host device 224 and PDA 226 are capable of communicating voice as well as data, voice codec 406 can be included in baseband section 400.

Baseband section 400 is responsible for communicating with host device 224 or PDA 226. Baseband section 400 takes information from host device 224 or PDA 226 and encodes it into a baseband signal that is passed to RF section 204 for transmission over the WAN. Conversely, baseband section 400 also takes baseband signals from RF section 204 and decodes them into signals that can be sent to host device 224 or PDA 226.

In order to communicate with host device 224 or PDA 226, baseband section 400 must be capable of implementing a software protocol that host device 224 or PDA 226 can interpret. Communication with host device 224 or PDA 226 is preferably controlled by a communication device, such as a UART 408 as illustrated in FIG. 4. Alternatively, a Universal Serial Bus (USB) device can control communication with host device 224 or PDA 226. Further, the software protocol used by baseband section 400 to communicate with host device 224 or PDA 226 is preferably stored in memory 404.

The encoding and decoding of information received from device 224 or PDA 226 into baseband signals is preferably performed by CPU/DSP 402. In order to correctly encode and decode the baseband signals, baseband section 400 must be configured to support the appropriate wireless data communication protocol. The appropriate wireless data communication protocol is dictated by the wireless network and, therefore, also tends to be highly dependent on the wireless access technology and multiple access technology being implemented. Some example communication protocols that can be supported are CDPD, Metricom/Ricochet2, GPRS/GPS, EDGE, CDMA 1xRTT, CDMA 3xRTT, and CDMA HDR. The software used by baseband section 400 to implement the wireless communication protocol is preferably stored in memory 404.

Baseband section 400 can also include advanced feature support 410 that allows device 200 to capture future applications, such as support for MP3, MPEG-4, MIDI, Digital-Voice for voice recognition, voice-to-text and text-to-voice conversion, voice memo/recording, GPS, Bluetooth/W-PAN, WLAN, etc.

FIG. 4 shows, schematically, the support for future advanced features. The objective of FIG. 4, in this regard, is to demonstrate that when an advanced feature 410 is implemented, baseband section 400 makes available the data appropriate for this "feature" to CPU/DSP 402. Further, appropriate application software stored, for example, in memory 404 can then enable CPU/DSP 402 to support this advanced feature.

c. Interface Unit

Figure 5:
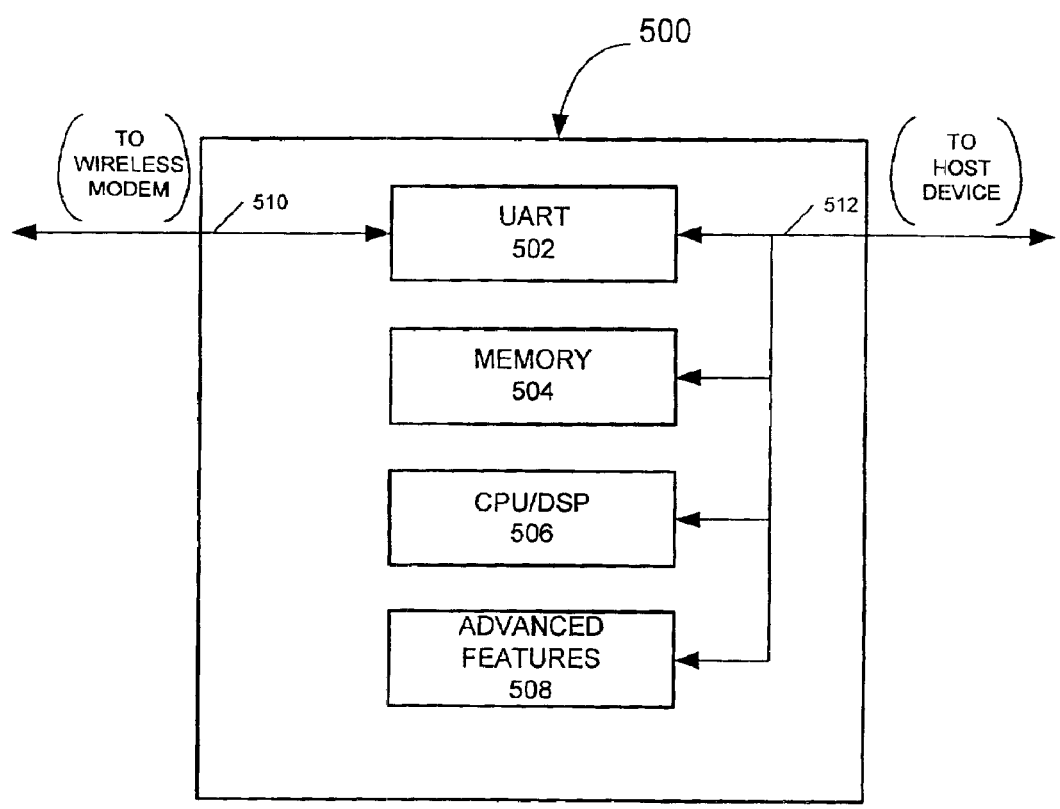
FIG. 5 illustrates on example embodiment of an interface unit that can be used in the device of FIG. 2.

Another option is for interface unit 212 to incorporate support for any advanced features. For example, FIG. 5 illustrates one implementation of an interface unit 500 that can support advanced features. Moreover, as data services continue to expand, wireless modem designs will likely not have sufficient CPU/DSP processing power for execution of extensive user/application code, due primarily to simply managing the wireless access. It may also be that extensive processing power within wireless modem 202 is undesirable for reasons of cost efficiency. Nevertheless, additional functionality, including CPU/DSP 506 and/or application memory 504, can be provided by including them in interface unit 500.

Additionally, if extensive application processing is performed within wireless modem 202, the execution speed may be impacted by a relatively slow serial interface between wireless modem 202 and host device 224 or PDA 226. For example, even if the fastest Universal Serial Bus (USB) speeds, e.g., 12 Mbps of USB 1.1, are available, execution speed can still be impacted.

Therefore, FIG. 5 demonstrates one method where a relatively slow serial interface at the output of wireless modem 202 does not preclude more powerful implementations via additional CPU/DSP 506 and/or memory 504 added in an interface unit 500. Such "co-processing" capability, including advanced features support 508, may be viewed as a powerful capability extension, and if a higher-speed serial connection is required, then a compatible USB 2.0 interface may be provided.

Figure 6:
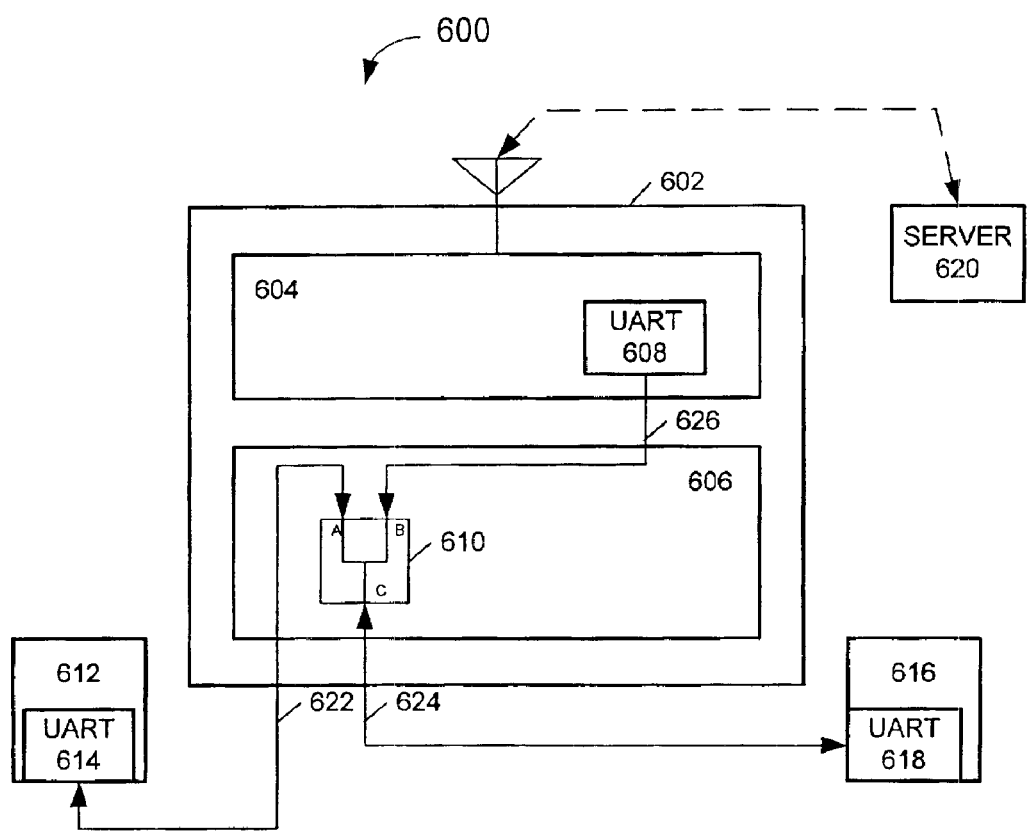
FIG. 6 illustrates a second example embodiment of a multi-mode wireless communication system in accordance with the invention.

Whether a UART or a USB controller controls communication between devices depends on the data rates that must be supported. If the data rates required for wireless data communication in a particular wireless network do not exceed 230 kbps, then high speed UARTs can be used for communication between devices. This is illustrated by FIG. 6, which illustrates a third embodiment of a multi-mode wireless system 600 in accordance with the systems and methods for multi-mode wireless communication.

System 600 comprises a multi-mode communication device 602 that includes a wireless modem 604 and an interface unit 606. Device 602 is interfaced with host device 612 and portable computing device 616, each of which, along with wireless modem 604, include a UART. Host device 612 uses UART 614 to communicate with wireless modem 604 or portable computing device 616. To do this, signals from UART 614 are coupled to interface unit 606, which includes some type of switching module 610 for switching the signals from UART 614 to their correct destination.

For example, if portable computing device 616 is syncing with host device 612, then switching module 610, will connect module port A with module port B. Signals can then travel between UART 614 and UART 618, which is included in portable computing device 616. Alternatively, if host device 612 is communicating with wireless modem 604, then switching module 610 connects module port A with module port C, so that signals can travel back and forth between UART 614 and UART 608 included in wireless modem 604. Similarly, if portable computing device 616 is communicating with wireless modem 604, then switching module 610 will connect module port B with module port C. Preferably, interface unit 606 includes a process for controlling signal routing between devices.

UARTs used in conjunction with the systems and methods for multi-mode wireless communication, such as UARTs 608, 614, and 616, preferably implement the RS232 signaling protocol. Therefore, each interface 622, 624, and 626, in FIG. 6, is preferably a RS232 interface. High speed UARTs are available with data rates up to 230 kbps, which is more than sufficient for many of the wireless data protocols available today. The following lists some example protocols and their data rates:

| | |
|---|---|
| 1. CDMA 1xRTT | 144 kbps; |
| 2. Ricochet | 128 kbps; |
| 3. CDPD | 19.2 kbps; and |
| 4. GPRS | 56 kbps. |

UARTs and RS232 communication, however, are not the only possible means for communication between devices. One alternative is for the devices and communication interfaces to be configured in accordance with the USB specification. In general, there are two reasons to support USB; connectivity and speed. Under version 1.1 of the USB specification, communication speeds can be as high as 12 Mbps.

Connectivity is defined as the ability to accept USB signals and provide wireless WAN access. This can be done in one of two ways: 1) a USB-slave controller can be included in the wireless modem; or 2) the interface unit can supply a USB-to-RS232 conversion so that USB enabled devices can communicate with the wireless modem. The second of these possibilities is illustrated by system 700 in FIG. 7. In system 700, host device 714 includes a USB-master controller 716 for communicating at high data rates. In a USB system, there is one master controller to which all peripheral devices are connected, and the master controller can be implemented in a combination of hardware, firmware, or software.

When host device 714 is communicating with portable computing device 722, switching module 710 connects module port A to module port B so that USB-master controller 716 is interfaced with USB-slave controller 726 included in portable computing device 722. If, on the other hand, host devices 714 is communicating with wireless modem 702, then switching module 710 connects module port A with module port C, which then interfaces the USB signals from USB-master controller 716 to converter 708. Converter 708 converts the USB signals to RS232 signals. Switching module 712 interfaces the resulting RS232 signals from converter 708 to UART 704 included in wireless modem 702 by connecting module port D to module port F.

In addition to USB-slave controller 726, portable computing device 722 preferably includes a UART for communicating with wireless modem 702. Thus, if portable computing device 722 is communicating with wireless modem 702, switching module 712 routes signals between UART 724 and UART 704 by connecting module port E to module port F. Therefore, in system 700 interfaces 730 and 732 are USB interfaces and interface 728 is a RS232 interface.

It should also be remembered, as mentioned above, that interface unit 706 can include additional processing and/or memory overhead in order to increase the speed of communication with wireless modem 702 in order to take advantage of the increased USB speeds available in system 700. It should also be noted that switching modules 710 and 712 are provided as examples of the signal routing that takes place within interface unit 706. According to the systems and methods for multi-mode wireless communication, the actual routing of signals can be implemented and controlled via software, firmware, hardware, or some combination thereof. Further, while converter 708 is preferably included in interface unit 706, alternative implementations may incorporate converter 708 into wireless modem 702.

Figure 7:
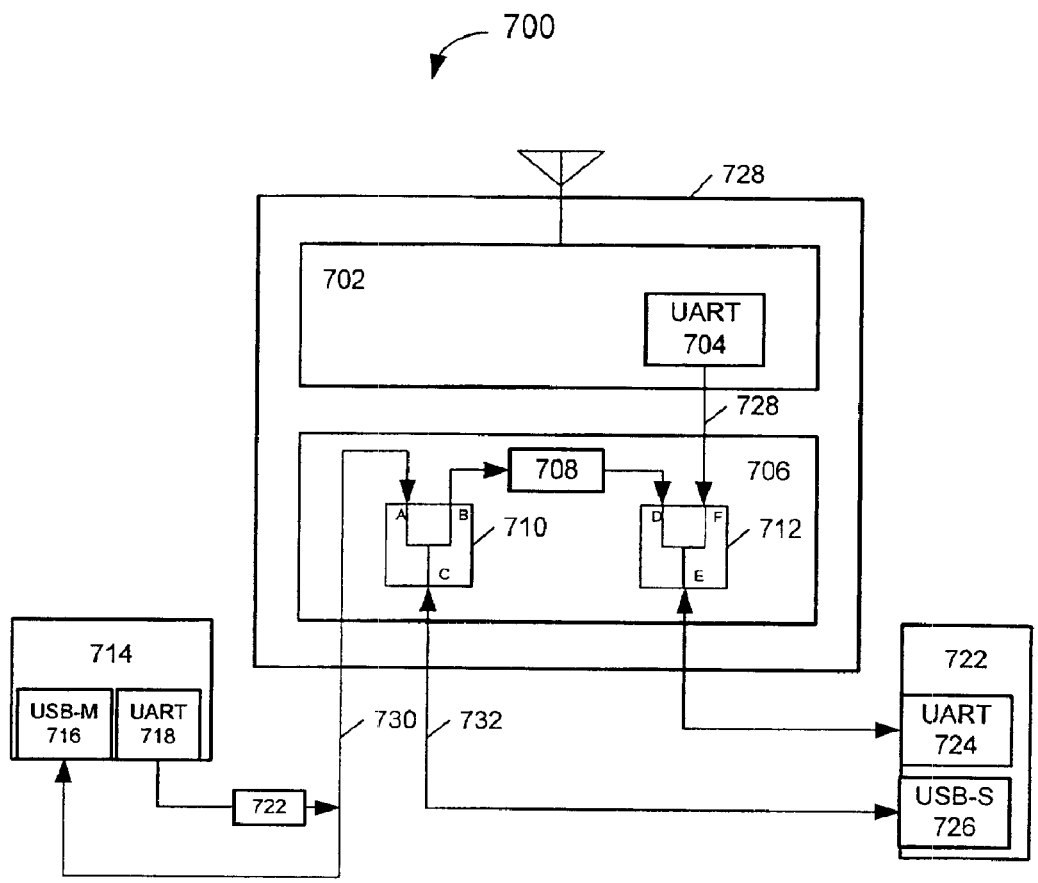
FIG. 7 illustrates a third example embodiment of a multi-mode wireless communication system in accordance with the invention.

As illustrated in FIG. 7, host device 714 can also include a UART 718 that uses RS232 signaling. In this case, a converter 722 is preferably included for converting the RS232 signals from UART 718 to USB signals that can be interfaced over interface 730 to interface unit 706. Alternatively, UART 718 can be interfaced to a module port (not shown) in switching module 712 that can be connected to module port F to allow direct communication with UART 704 in wireless modem 702.

Figure 8:
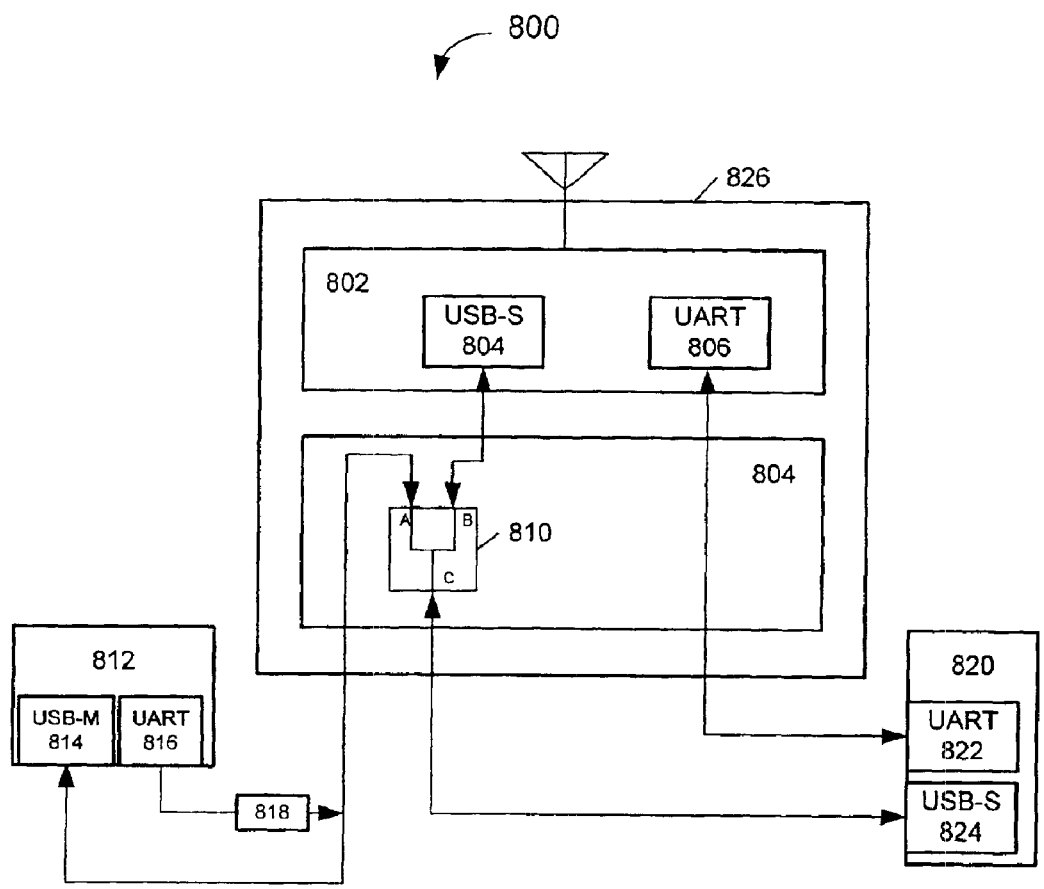
FIG. 8 illustrates a fourth example embodiment of a multi-mode wireless communication system in accordance with the invention.

The wireless modem used in conjunction with the systems and methods for multi-mode wireless communication can also include be USB enabled. For example, FIG. 8 illustrates a system 800 wherein wireless modem 802, included in device 826, includes a USB-slave controller 804. In this case, signals from USB-master controller 814 in host device 812 can be connected directly to USB-slave controller 804 through switching module 810. To do this, switching module 810 connects module port A to module port B. If host device 812 is communicating with portable computing device 820, then switching module 810 connects module port A with module port C, which connects USB-master controller 814 to USB-slave controller 824.

Portable computing device 820 preferably includes a UART 822 for communicating with wireless modem 802. In this case, wireless modem 802 includes UART 806 as shown.

Again, host device 812 can also include a UART 816. In this case, converter 818 is preferably included to convert the RS232 signals from UART 816 to USB signals that can be communicated to USB-slave controller 804. Alternatively, UART 816 is interfaced directly with UART 806.

Figure 9:
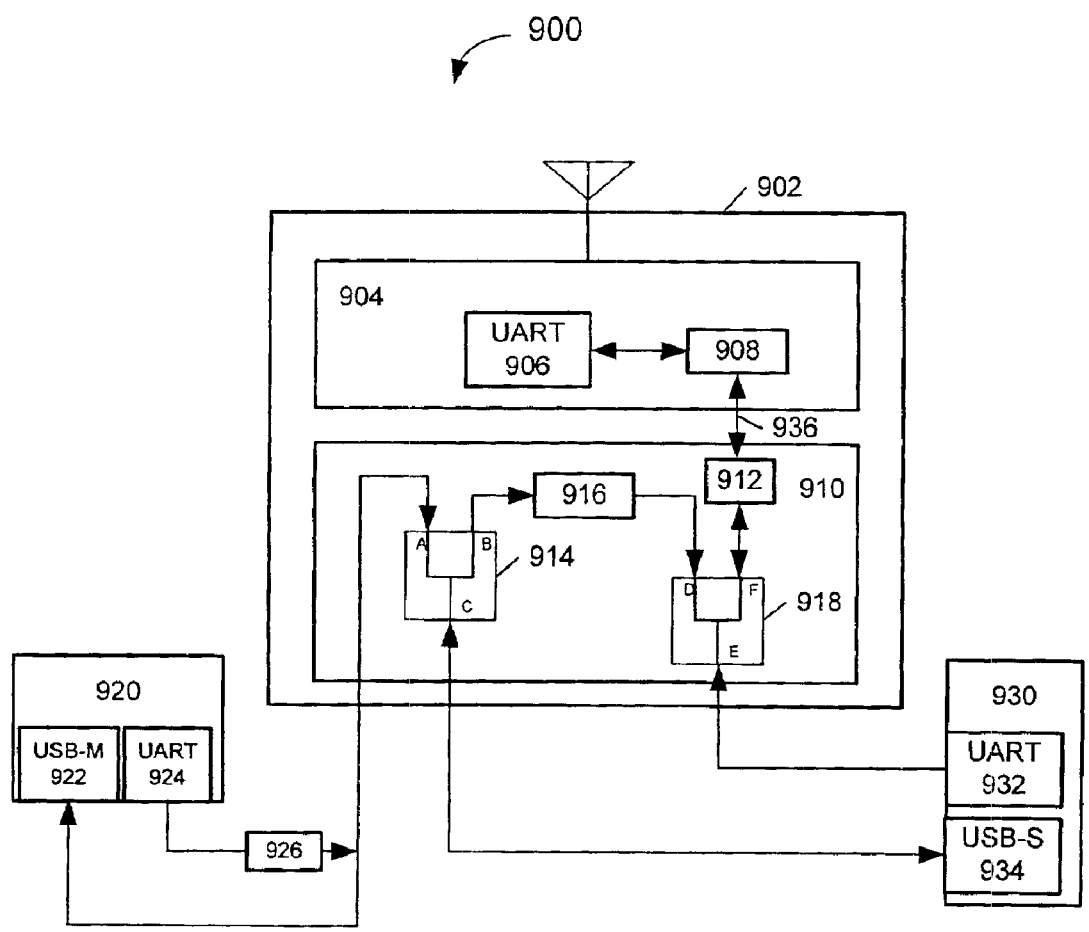
FIG. 9 illustrates a fifth example embodiment of a multi-mode wireless communication system in accordance with the invention.

System 900 in FIG. 9 illustrates a device 902 in which, wireless modem 904 resides on a removable PCMCIA circuit card. As a result, interface 936 is a PCMCIA interface, meaning that signals traveling across interface 936 are preferably converted to RS232 or USB signals, both in wireless modem 904 and in interface unit 912.

In the example illustrated in FIG. 9, wireless modem 904 only includes a UART 906. Therefore, wireless modem 904 also includes converter 908, which is configured to convert PCMCIA signals received through interface 936 to RS232 signals that can be sent to UART 906. In alternative implementations, wireless modem 904 can include a USB-slave controller (not shown), and would, therefore, also need to include a converter (not shown) for converting the PCMCIA signals to USB signals.

Interface unit 910 also includes a converter 912 for converting PCMCIA signals received through interface 936 to RS232 signals. If portable computing device 930 is communicating with wireless modem 904, then these RS232 signals can be routed, via switching module 918, to UART 932 in portable computing device 930. If, on the other hand, host device 920 is communicating with wireless modem 920, then the RS232 signals can be routed, via switching module 918 to converter 916, which is configured to convert the RS232 signals to USB signals. The USB signals are then routed, via switching module 914 to USB-master controller 922 in host device 920.

If host device 920 is communicating with portable computing device 930, then USB-master controller 922 is interfaced, via switching module 914, to USB-slave controller 934.

Again, host device 920 can include a UART 924, in which case RS232 to USB converter 926 is preferably included in system 900.

The switching modules included in systems 600, 700, 800, and 900 are for illustration only. As was mentioned in relation to system 700, the actual routing of signals by the interface unit can be accomplished and/or controlled via software, firmware, hardware, or some combination thereof, depending on the particular implementation. Further, the inclusion of the switching modules and/or converters in either the interface unit or the wireless modem is also a design choice that will be influenced by the particular implementation. Therefore, the systems described herein should be viewed as examples only. It should also be noted that various other configurations are possible that do not depart from the scope of the invention or the claims that follow this description. Thus, the examples illustrated herein should not be seen as limiting the systems and methods for multi-mode wireless communication to any particular hardware configuration.

Figure 10:
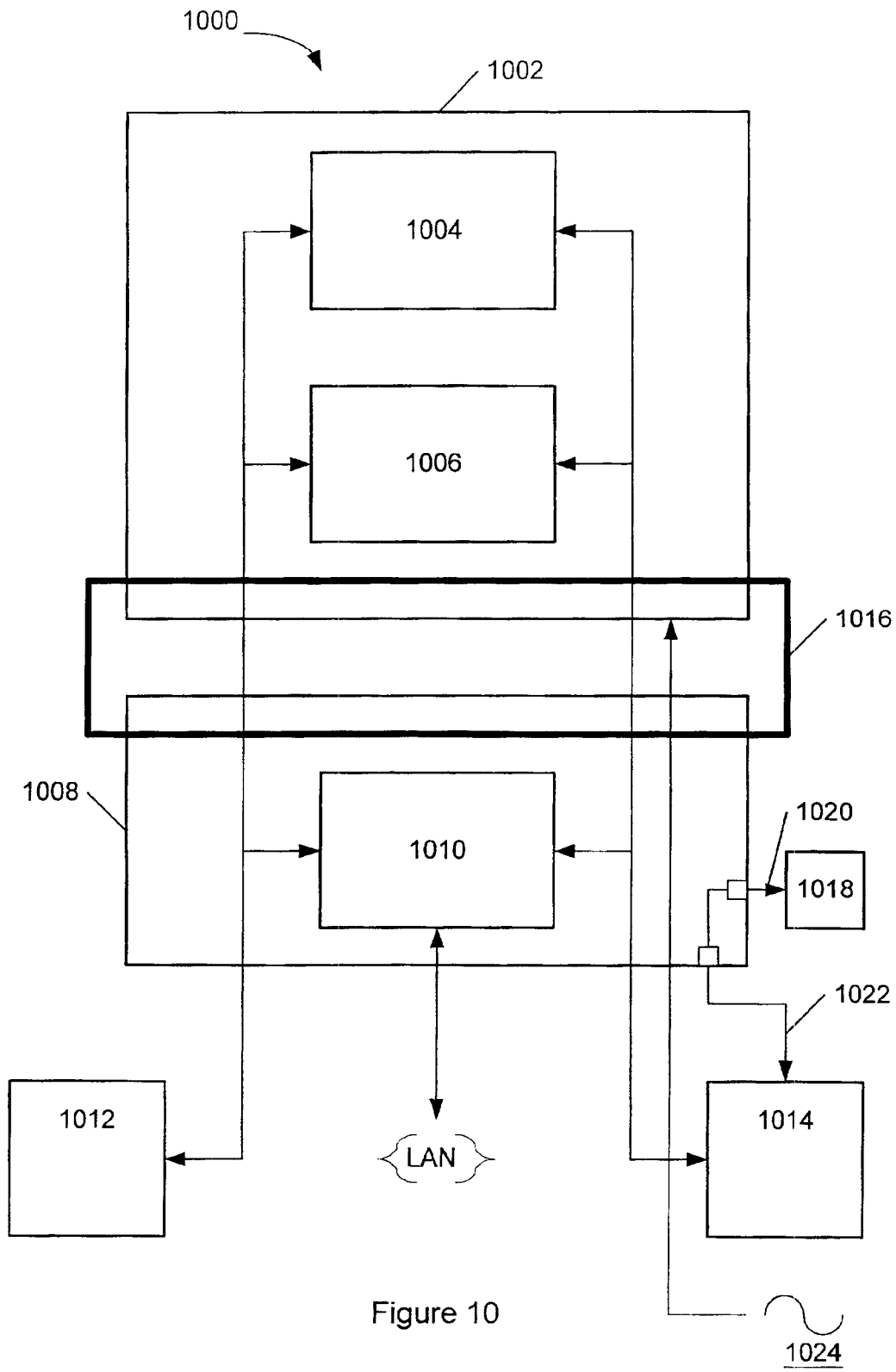
FIG. 10 illustrates a sixth example embodiment of a multi-mode wireless communication system in accordance with the invention

As a final example, FIG. 10 illustrates a system 1000 that includes a device 1002 configured to interface with a docking station 1008 through interface 1016. As illustrated, docking station 1008 can interface communication signals from host device 1012 and portable computing device 1014 to interface unit 1006 and wireless modem 1004 through interface 1016. In addition, docking station 1008 can also include a wired modem 1010 to provide host device 1012 and/or portable computing device 1014 access, e.g. V.90 or DSL access, to a LAN.

Docking station 1008 can also interface a power signal, such as AC power signal 1024, to device 1002 through interface 1016. Power signal 1024 can be used to charge portable computing device 1014 and/or supply power to device 1002.

In certain configurations, portable computing device 1014 accessories, such as a keyboard for example can be interfaced to docking station 1008. Portable computing device 1014 can then interface with the accessories when it is placed in docking station 1008. This is accomplished, for example, by connection 1020 between accessory 1018 and docking station 1008 and connection 1022 between docking station 1008 and portable computing device 1014. It should also be noted that interface device 1006 is preferably configured to operate as described above as is wireless modem 1004.

Therefore, by implementing the systems and methods for multi-mode wireless communication a portable computing device and a host device can use one modem to interface with a single WAN or other network. Moreover, the two can be interfaced to the WAN at the same time if required. The user is, therefore, saved form buying multiple wireless modems for accessing disparate networks or from constantly switching a single modem card from device to device. Additionally, docking station 1008 can be used to extend the functionality of a device such as device 1002 by providing, for example, external power and/or LAN access.

While embodiments and implementations of the invention have been shown and described, it should be apparent that many more embodiments and implementations are within the scope of the invention. Accordingly, the invention is not to be restricted, except in light of the claims and their equivalents.

What is claimed is:

1. A device, comprising:
   a wireless modem configured to communicate with a wireless network; and
   an interface unit communicatively coupled to the wireless modem, the interface unit configured to:
   interface a host device to a portable computing device;
   interface the host device with the wireless network through the wireless modem; and
   interface the portable computing device with the wireless network through the wireless modem.

2. The device of claim 1, wherein the interface unit further comprises a signal converter configured to convert signals sent from the portable computing device and/or the host device to the wireless modem from a first type of signal used by the portable computing device and/or the host device to a second type of signal used by the wireless modem.

3. The device of claim 2, wherein the first type of a signal is a USB signal or a RS232 signal.

4. The device of claim 2, wherein the second type of signal is a PCMCIA signal or a RS232 signal.

5. The device of claim 1, wherein the wireless modem comprises a signal converter configured to convert signals received from the interface unit to an appropriate signal type used by the wireless modem.

6. The device of claim 1, wherein the wireless modem is contained on a removable modem card, and wherein the device further comprises a slot configured to receive the removable modem card and to interface the removable modem card to the modem interface unit.

7. The device of claim 1, wherein the device is configured to interface the personal computing device and the host device to the World Wide Web through the wireless modem.

8. The device of claim 1, wherein the device is configured to interface the portable computing device and/or the host device through the wireless modem to a server connected to the wireless network for data communication.

9. The device of claim 8, wherein the device is configured to interface the portable computing device and the host device to the server simultaneously.

10. The device of claim 1, wherein the device is configured to interface the portable computing device through the wireless modem to a server connected to the wireless network for synchronizing information.

11. The device of claim 1, wherein the device is configured to interface the host device to the portable computing device through the interface unit for synchronizing information.

12. The device of claim 1, further comprising a docking station interface configured to interface the device to a docking station, the docking station configured to accept the portable communication device.

13. The device of claim 12, wherein the docking station is configured to interface a power signal to the device through the docking station interface.

14. The device of claim 12, wherein the docking station includes a wired modem, and wherein the docking station is configured to interface the portable computing device and/or the host device to a LAN through the wired modem.

15. The system of claim 12, wherein the device is configured to interface the portable computing device through the docking station interface to accessories attached to the docking station.

16. A system, comprising:
   a server connected to a wireless network;
   a portable computing device;
   a host device; and
   a device, comprising:
   a wireless modem configured to communicate with the wireless network; and
   an interface unit communicatively coupled to the wireless modem, the interface unit configured to:
   interface the host device to the portable computing device;
   interface the host device with the server through the wireless modem; and
   interface the portable computing device with the server through the wireless modem.

17. The system of claim 16, wherein the device further comprises a docking station interface configured to interface the device to a docking station, the docking station configured to accept the portable communication device.

18. The system of claim 16, wherein the docking station includes a wired modem, and wherein the docking station is configured to interface the portable computing device and/or the host device to a LAN through the wired modem.

19. The system of claim 16, wherein the device is configured to interface the portable computing device through the docking station interface to accessories attached to the docking station.

20. The system of claim 16, wherein the wireless modem is contained on a removable modem card, and wherein the device further comprises a slot configured to receive the removable modem card and to interface the removable modem card to the modem interface unit.

21. The system of claim 16, wherein the server is configured to interface the personal computing device and the host device to the World Wide Web.

22. The system of claim 16, wherein the device is configured to interface the portable computing device and/or the host device to the server for data communication.

23. The system of claim 16, wherein the device is configured to interface the portable computing device and the host device to the server simultaneously.

24. The system of claim 16, wherein the device is configured to interface the portable computing device to the server for synchronizing information.

25. The system of claim 16, wherein the device is configured to interface the host device to the portable computing device through the interface unit for synchronizing information.

* * * * *